June 8, 1965   M. W. GILMORE ET AL   3,187,722
COMBINATION INSECTICIDE APPLICATOR AND FEEDER
Filed Oct. 12, 1962   2 Sheets-Sheet 1

INVENTORS.
Merwin W. Gilmore
Jerald W. Bishop
BY Robert B. McVay

John A. Hamilton
Attorney.

June 8, 1965 M. W. GILMORE ET AL 3,187,722
COMBINATION INSECTICIDE APPLICATOR AND FEEDER
Filed Oct. 12, 1962 2 Sheets-Sheet 2

INVENTORS.
Merwin W. Gilmore
Jerald W. Bishop
BY Robert B. McVay

John A. Hamilton
Attorney.

United States Patent Office 3,187,722
Patented June 8, 1965

3,187,722
COMBINATION INSECTICIDE APPLICATOR
AND FEEDER
Merwin W. Gilmore, Jerald W. Bishop, and Robert B.
McVay, Clay Center, Kans., assignors to Gilmore-
Tatge Manufacturing Co., Inc., Clay Center, Kans., a
corporation of Kansas
Filed Oct. 12, 1962, Ser. No. 230,225
14 Claims. (Cl. 119—157)

This invention relates to new and useful improvements in insecticide applicators for livestock, and has particular reference to devices for applying insecticide to the heads and faces of cattle and other livestock. The device has particular applicability in combating face flies, although it is not limited to this usage. Face flies swarm about the heads and faces of livestock, feeding on the mucuous fluids of the eyes, and are extremely damaging and distressing to the stock.

The principal object of the present invention is the provision of a device including a bin or box for containing mineral feed, salt, or other feed material attractive and beneficial to the stock, and an insecticide saturated applicator member so disposed relative to the bin that an animal cannot gain access to the feed material without rubbing its face over the applicator. The device also includes a reservoir for liquid insecticide, and novel means for feeding the insecticide from the reservoir to the applicator at a desired flow rate.

Another object is the provision of a device of the character described wherein the applicator and its supporting structure serves as an umbrella or canopy protecting the feed bin against the entry therein of rain, snow or other moisture. This permits use of the device to feed mineral feeds, granular salt and other nutrients which are damaged by water and which hence could heretofore not be fed in the field.

Other objects are simplicity and economy of construction, efficiency and dependability of operation, protection of the device from damage by animals pushing or bumping thereagainst, and adjustability for use by animals of different heights.

Figure 1:
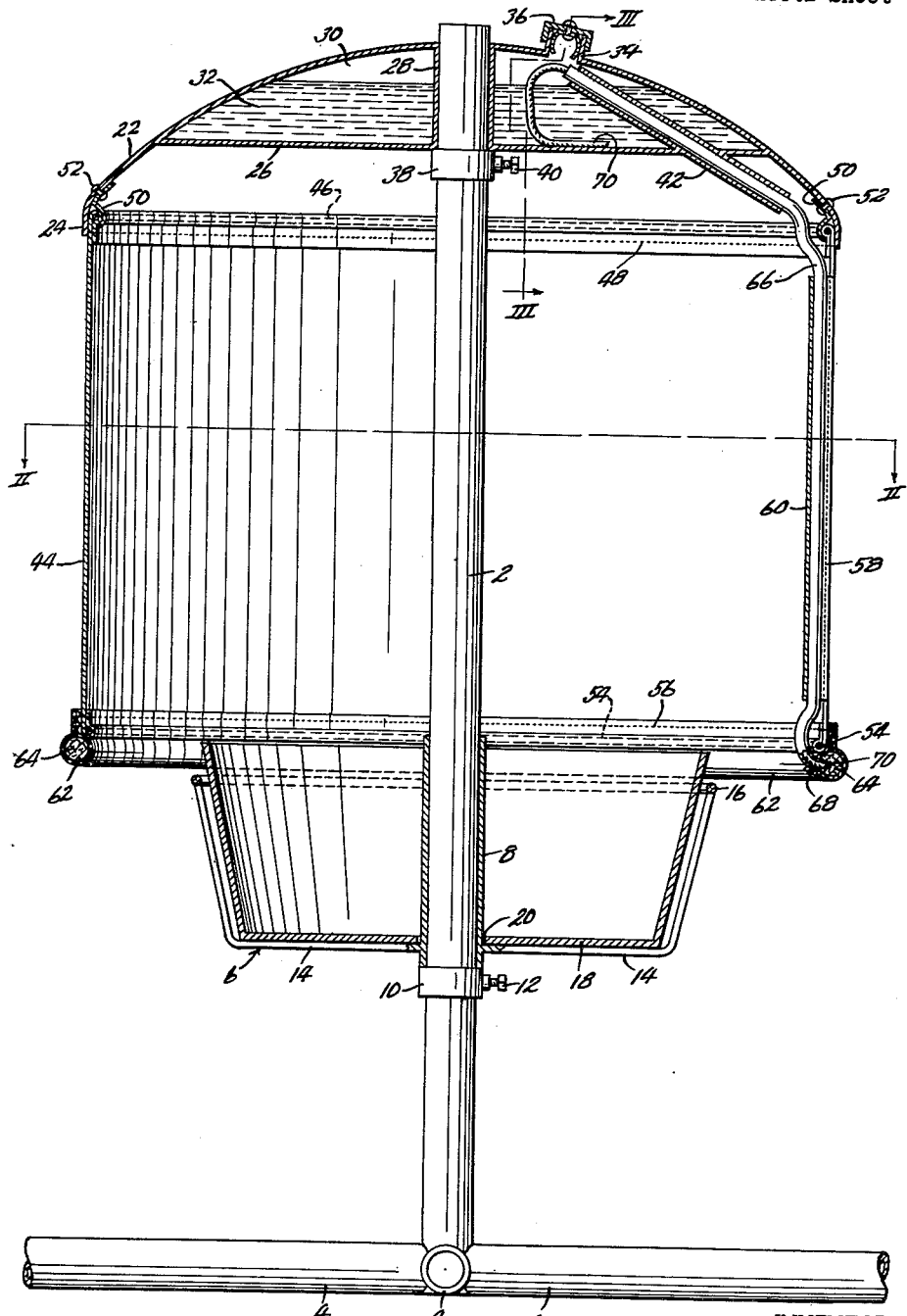
Figure 2:
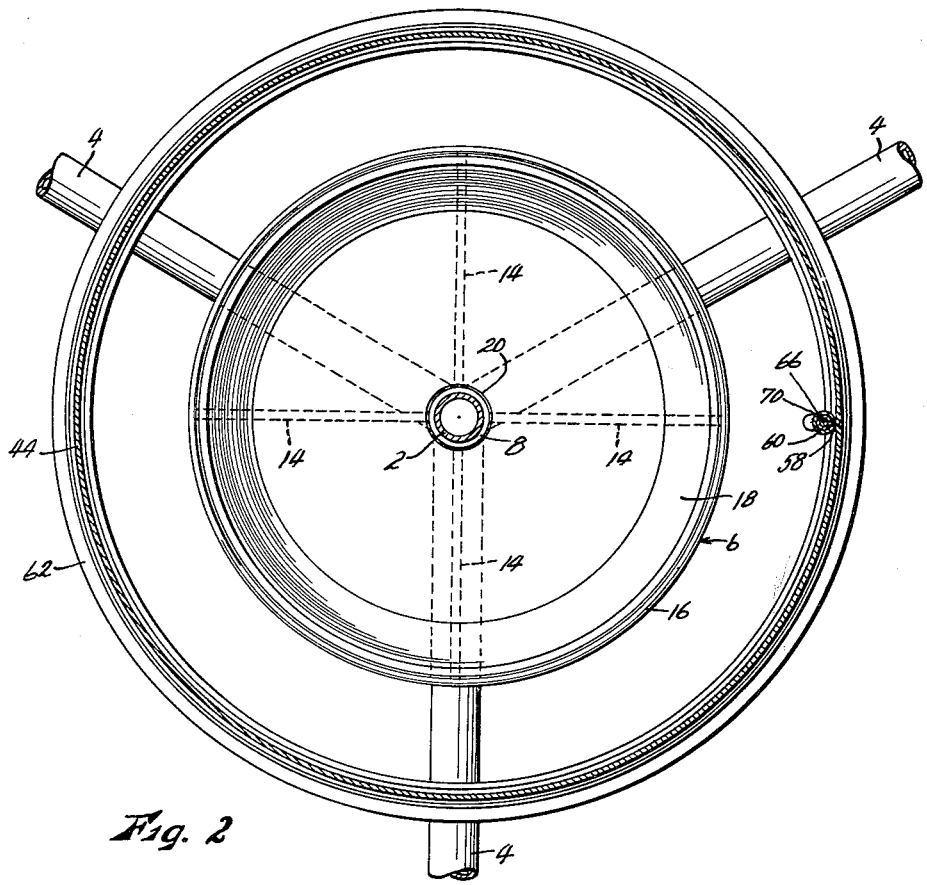
Figure 3:
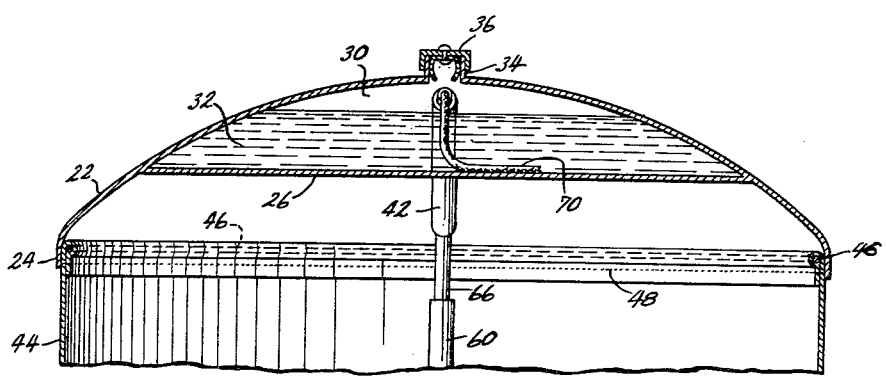

With these objects in view, as well as other objects which will appear in the course of the specification, reference will be had to the accompanying drawing, wherein:

FIG. 1 is a vertical sectional view taken through a combination insecticide applicator and feeder embodying the present invention, with parts left in elevation, FIG. 2 is a fragmentary sectional view taken on line II—II of FIG. 1, and FIG. 3 is a fragmentary sectional view taken on line III—III of FIG. 1.

Like reference numerals apply to similar parts throughout the several views, and the numeral 2 applies to a central vertical standard which may be tubular as shown, and which is supported by a base constituting a plurality of legs 4 affixed to and extending horizontally outwardly from the lower end of the standard. The legs are broken off in the drawing to conserve space, but it will be understood that they are sufficiently long to support standard 2 with good stability to prevent overturning thereof by livestock. Obviously, standard 2 could also be supported by driving it into the ground, or by setting it in concrete.

Adjacent the lower end of the standard, there is mounted thereon a feed bin holder 6 consisting of a tubular hub 8 mounted on the standard for rotation and axial sliding movement thereon and supported at an adjustable elevation thereon by a collar 10 releasably fixed on the standard by a set screw 12, a plurality of rod-like arms 14 affixed to and extending radially outwardly from said hub, the outer end potrions of said arms being bent upwardly and affixed at their upper ends to a horizontal hoop 16 which is concentric with standard 2. A feed bin 18, preferably formed of a material which is not attacked by salt or other minerals, is supported in holder 6, having a hole 20 formed in the floor thereof through which hub 8 extends. Said bin is adapted to contain salt or feed material. Its elevation above the ground may be adjusted to the height of the animals being fed by loosening set screw 12. The rotatability of holder hub 8 on standard 2 provides that if an animal should brush or press against the holder, it will simply rotate on the standard in all cases except in the relatively rare instances that the pressure is exerted exactly radially to the standard. This prevents much of the bending and other damage of the bin and its holder which otherwise would occur.

Mounted on the upper portion of standard 2 is an upwardly convex sheet metal dome 22, said dome being circular, concentric with standard 2, and having a depending peripheral lip 24 at its outer edge. A horizontal planar partition 26 is fixed within the dome, being fixed about its entire periphery to said dome. A cylindrical sheet metal sleeve 28 extends vertically between the center of dome 22 and the center of partition 26, and is affixed thereto, whereby the space between said dome, partition and sleeve constitutes a reservoir 30 for containing a liquid insecticide 32. Said reservoir is provided with a fill neck 34 having a cap 36, whereby insecticide may be poured therein. Sleeve 28 forms a tubular bearing which is mounted on standard 2 for rotation and axial sliding movement thereon. The dome is supported adjustably on said standard by a collar 38 fixed on said standard by a set screw 40, and engaged by the lower face of partition 26. A metal tube 42 is sealed, by soldering or otherwise, in partition 26, extending at its lower end below said partition to a point adjacent the edge of the dome, and extending at its upper end into reservoir 30 to a point above the insecticide level therein and adjacent fill neck 34.

A sleeve 44 of pliable, moisture-proof material such as plastic film or waterproofed fabric depends from dome 22, said sleeve being cylindrical and of the same diameter as said dome. A circular hoop 46 formed of steel rod is sewed in the upper edge of said sleeve by a line of stitching 48, and said hoop is engaged by a plurality of clips 50 secured in dome 22 by fasteners 52, whereby the sleeve is supported. Also, a circular steel rod hoop 54 is secured in the lower edge of said sleeve by stitching 56, so that the lower end of the sleeve is maintained in circular form. The material of which the sleeve is formed is gathered longitudinally and secured by stitching 58 to form a tube 60 extending vertically along the inner surface of said sleeve, the upper end of tube 60 being aligned with the lower end of tube 42.

Attached to the lower edge of sleeve 44 by stitching 56, and extending around the entire periphery thereof, is an applicator ring comprising a tube 62 formed of a pliable, moisture-permeable material such as canvas, said tube being filled with a wicking material 64 such as jute fiber. It will be noted in FIG. 1 that wick tube 64 is horizontally disposed, and is normally disposed just below the top of bin 18. A pliable tube 66 of a waterproof material such as plastic extends from the upper end of reservoir tube 42 downwardly through said tube, thence downwardly through tube 60 of sleeve 44, and extends at its lower end into canvas tube 62, being secured therein by any suitable means such as staple 68. A wick 70 extends completely through tube 66, extending from said tube at its upper end to depend freely into the liquid insecticide 32 in reservoir 30, and extending at its lower end into the wicking material 64 of canvas tube 62.

Operation of the device is believed to be reasonably apparent. Liquid insecticide is conducted by wick 70 from reservoir 30 downwardly through tube 66 into the wicking 64 of canvas tube 62, whereby said canvas tube is maintained saturated with insecticide at all times. Proper selection of wick 70 will insure flow of the insecticide at the approximate rate at which it will be used. Cattle or other livestock, to gain access to the feed material contained in bin 18, then must deflect sleeve 44 with their heads and faces, and in so doing the insecticide-saturated canvas sleeve 62 moves across their faces and applies insecticide thereto. Since sleeve tube 60, plastic tube 66 and wick 70 are all pliable, they do not interfere with the free yieldability of canvas applicator ring 62 in any direction, so that livestock animals have free access to the device from any side. Dome 22 and sleeve 44 form a waterproof canopy protecting the feed in bin 18 against rain, snow or other moisture, thus permitting use in the field of feed materials, such as granular salt and mineral supplements, which would otherwise be damaged by water.

The animals of course cannot see the feed in bin 18 when sleeve 44 extends below the top of the bin as shown in FIG. 1. For this reason, it has been found desirable in some instances, when instituting first use of the device, to elevate applicator ring 62 a few inches above the bin by loosening set screw 40 and raising collar 38 slightly on standard 2. The animals can then see the feed in the bin and have easy access thereto. After perhaps a few days to allow the animals to become accustomed to the use of the device, the sleeve may be gradually lowered to the position shown, in which the application of insecticide is more efficient. However, in actuality very little trouble has been experienced along these lines in actual tests. Most animals, guided perhaps by their sense of smell, seem to learn very easily to reach the feed by deflecting the applicator ring with their heads.

While we have shown and described a specific embodiment of our invention, it will be readily apparent that many minor changes of structure and operation could be made without departing from the spirit of the invention as defined by the scope of the appended claims.

What we claim as new and desire to protect by Letters Patent is:

1. A combination insecticide applicator and feeder comprising:
   (a) a vertically extending, rigidly supported standard,
   (b) an upwardly opening feed bin supported by said standard adjacent the lower end thereof,
   (c) an applicator ring of moisture permeable material disposed in a horizontal plane adjacent the top of said bin with all points thereof being spaced outwardly from said bin,
   (d) a rigid dome supported by said standard concentrically with but spaced above said feed bin, and being of similar horizontal contour as said applicator ring,
   (e) a tubular sleeve of pliable material secured at its upper end to said dome and at its lower end to said applicator ring, whereby said applicator is suspended for free lateral movement,
   (f) a reservoir for liquid insecticide carried by said dome, and
   (g) a tube extending between and interconnecting said reservoir and said applicator ring.

2. The structure as recited in claim 1 wherein said dome and said tubular sleeve are formed of waterproof material, whereby conjointly to form a waterproof canopy protecting said feed bin.

3. The structure as recited in claim 1 wherein said last named tube is pliable, whereby to prevent interference thereby with the lateral movement of said applicator ring.

4. The structure as recited in claim 1 wherein said last named tube opens into said reservoir above the liquid level therein and with the addition of a pliable wick extending through said tube and depending therefrom into the insecticide within said reservoir.

5. The structure as recited in claim 1 wherein said dome and said feed bin are independently vertically adjustable with respect to said standard.

6. The structure as recited in claim 1 wherein said feed bin is mounted on said standard for free rotation about its vertical axis.

7. The structure as recited in claim 1 wherein said dome is mounted on said standard for free rotation about a vertical axis.

8. The structure as recited in claim 1 wherein said feed bin and said dome are mounted on said standard for independent free rotation about a common vertical axis.

9. A dispenser for applying a livestock treating agent to the face and head area of an animal, said dispenser consisting of a single upright support standard, a salt lick receptacle mounted on and surrounding said standard at a height so as to be accessible by the particular livestock involved, a liquid treating agent reservoir mounted on the standard above the salt lick receptacle, said reservoir being of a size and so located as to be out of the path of movement normally taken by the head of an animal in moving toward and away from the salt lick reservoir, a relatively soft flexible panel surrounding the standard, means securing the upper edge of the panel to the reservoir, said panel depending freely from said upper edge toward said receptacle a distance sufficient so as to require contact therewith upon movement of the head of an animal toward the receptacle, and means for transferring a treating agent from the reservoir to the flexible panel, said panel being positioned outwardly from said standard a distance so as to be located outwardly of the receptacle, relative to the standard, completely thereabout, and wherein the reservoir and the receptacle are individually adjustable along the support standard, and wherein the means for transferring a treating agent consists of a relatively soft flexible liquid transferring wick secured to the panel around the lower edge thereof, a second relatively soft flexible liquid transferring wick communicating the first wick with the interior of the reservoir, and a flexible generally non-absorbent tube secured to the panel and surrounding the second wick between the reservoir and the first wick.

10. A combination insecticide applicator and feeder comprising:
   (a) A vertically extending, rigidly supported standard,
   (b) an upwardly opening feed bin supported by said standard adjacent the lower end thereof,
   (c) an applicator ring of moisture permeable material disposed in a horizontal plane adjacent the top of said bing with all points thereof being spaced outwardly from said bin,
   (d) a tubular sleeve of pliable material affixed at its lower edge to said applicator ring and at its upper edge to said standard, whereby said applicator ring is suspended concentrically with said bin for free lateral movement, and
   (e) means operable to maintain said applicator ring saturated with liquid insecticide.

11. The structure as recited in claim 10 wherein said pliable sleeve and its attachment to said standard constitute a waterproof canopy covering said feed bin to prevent moisture from entering said bin.

12. A combination insecticide applicator and feeder comprising:
   (a) a vertically extending, rigidly supported standard,
   (b) an upwardly opening feed bin supported by said standard adjacent the lower end thereof,
   (c) an applicator ring of moisture permeable material disposed in a horizontal plane adjacent the top of said bin with all points thereof being spaced outwardly from said bin,
   (d) pliable support means attached at its lower end to said applicator ring and attached at its upper end to said standard, whereby said applicator ring is suspended concentrically with said bin for free lateral movement,
(e) a reservoir for liquid insecticide carried by said standard, and
(f) a tube extending between and interconnecting said reservoir and said applicator ring.

13. The structure as recited in claim 12 wherein said last named tube is pliable, whereby to avoid interference thereby with the free lateral movement of said applicator ring.

14. The structure as recited in claim 12 wherein said last named tube opens into said reservoir above the liquid level therein, and with the addition of:
(a) a wick extending through said tube and depending therefrom into the insecticide within said reservoir, whereby to determine and regulate the flow rate of insecticide through said tube.

References Cited by the Examiner

UNITED STATES PATENTS

| | | | |
|---|---|---|---|
| 882,985 | 3/08 | Wilson | 119—157 |
| 1,259,416 | 3/18 | La Breche | 119—157 |
| 1,710,314 | 4/29 | Kyle | 119—157 |
| 2,273,616 | 2/42 | Beatty | 119—157 |
| 2,438,731 | 3/48 | Wedeking | 119—157 |
| 2,777,421 | 1/57 | Hiebert | 119—157 |
| 3,016,879 | 1/62 | Ryan | 119—157 |
| 3,135,241 | 6/64 | Mann | 119—157 |

SAMUEL KOREN, *Primary Examiner.*

ALDRICH F. MEDBERY, *Examiner.*